(12) United States Patent
Ito et al.

(10) Patent No.: US 7,636,037 B2
(45) Date of Patent: Dec. 22, 2009

(54) VEHICLE LIGHTING APPARATUS

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 413 days.

(21) Appl. No.: 11/635,172

(22) Filed: Dec. 7, 2006

(65) Prior Publication Data

US 2007/0132602 A1     Jun. 14, 2007

(30) Foreign Application Priority Data

Dec. 12, 2005    (JP) .............................. 2005-357495

(51) Int. Cl.
    *B60Q 11/00*   (2006.01)
(52) U.S. Cl. .................. 340/458; 340/815.45; 315/291; 315/307; 315/77
(58) Field of Classification Search ................ 340/458, 340/642, 660, 815.45; 315/307, 77, 291, 315/312, 82, 83; 362/20
    See application file for complete search history.

(56) References Cited

U.S. PATENT DOCUMENTS 6,153,980 A * 11/2000 Marshall et al. ......... 315/200 A (Continued)

FOREIGN PATENT DOCUMENTS

DE        198 41 490 A1      3/2000

(Continued)

OTHER PUBLICATIONS

Graf A and Tihanyi J (Siemens AG), Failure protection device for series LED's uses respective bypass device across each series LED for selective bypass of faulty LED, Derwent-ACC-No. 2000-247408, Abstract-Pub-No. DE 19841490 A1, Mar. 2000.*

(Continued)

*Primary Examiner*—Davetta W Goins
*Assistant Examiner*—Anne V Lai
(74) *Attorney, Agent, or Firm*—Osha • Liang LLP

(57) ABSTRACT

A vehicle lighting apparatus includes a plurality of semiconductor light sources that are connected with each other in series, a switching regulator for supplying an electric power from a power source to each of said plurality of semiconductor light sources, forward voltage detection circuitry for detecting a forward voltage of each group by dividing said plurality of semiconductor light sources into groups; and failure detection circuitry for detecting the failure of the semiconductor light sources belonging to said each group based on the detected output of said each forward voltage detection circuitry. There are arranged between said groups a first voltage detection terminal and a second voltage detection terminal, mutually connected, as the voltage detection terminals connected to the forward voltage detection means to detect at least one of said groups, as well as a first failure detection wiring connecting the semiconductor light sources belonging to one group and said first voltage detection terminal and a second failure detection wiring connecting the semiconductor light sources belonging to the other group and said second voltage detection terminal.

5 Claims, 5 Drawing Sheets

U.S. PATENT DOCUMENTS

| | | | | |
|---|---|---|---|---|
| 7,023,232 B2* | 4/2006 | Yano et al. | ................... | 324/767 |
| 7,081,722 B1* | 7/2006 | Huynh et al. | ................ | 315/323 |
| 7,105,945 B2* | 9/2006 | Shiotsu et al. | ............. | 307/10.8 |
| 7,244,036 B2* | 7/2007 | Murakami et al. | ............ | 362/20 |
| 7,245,085 B2* | 7/2007 | Villarin | ....................... | 315/188 |
| 7,301,447 B2* | 11/2007 | Patel | ........................... | 340/475 |
| 7,479,743 B2* | 1/2009 | Namba et al. | ................ | 315/307 |
| 2005/0018726 A1* | 1/2005 | Dinger et al. | ............ | 372/38.09 |
| 2005/0174420 A1* | 8/2005 | Hayashi | ...................... | 347/130 |
| 2007/0085494 A1* | 4/2007 | Takeda et al. | ............... | 315/316 |

FOREIGN PATENT DOCUMENTS

| | | |
|---|---|---|
| DE | 102 09 374 A1 | 7/2003 |
| DE | 10 2006 049 291 A1 | 4/2007 |
| JP | 2007-134147 | 4/2004 |

OTHER PUBLICATIONS

German Office Action issued in German Application No. 10 2006 058 509.7-31 dated Dec. 20, 2007 and English translation thereof, 11 pages.

Patent Abstracts of Japan, Publication No. 2004-134147, Publication Date: Apr. 30, 2004, 2 pages.

* cited by examiner

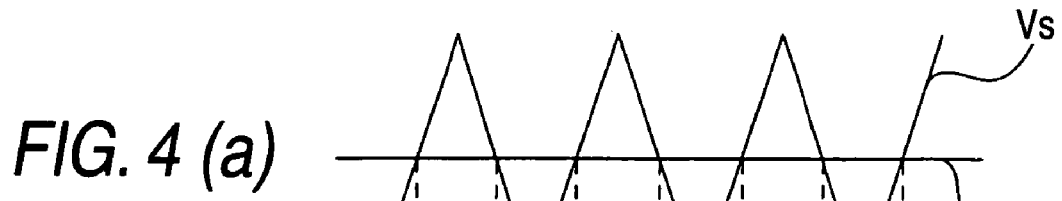
FIG. 4 (a)
FIG. 4 (b)
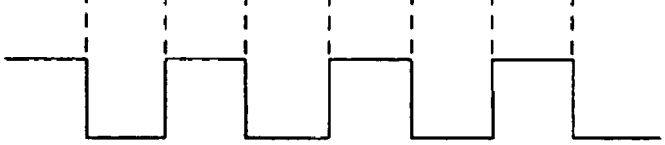
FIG. 4 (c)
FIG. 4 (d)
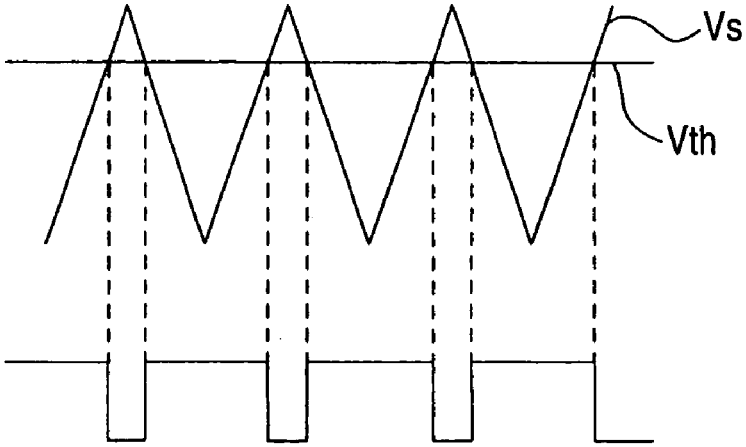
FIG. 4 (e)
FIG. 4 (f)
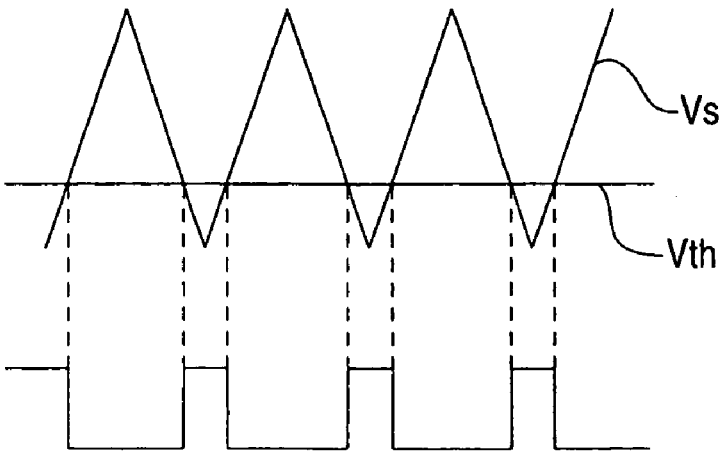

VEHICLE LIGHTING APPARATUS

This application claims foreign priority from Japanese Patent Application No. 2005-357495, filed Dec. 12, 2005, the entire contents of which are hereby incorporated by reference.

BACKGROUND OF THE INVENTION

1. Field of the Invention

The present invention relates to a vehicle lighting apparatus, and more particularly to a vehicle lighting apparatus that controls the lighting of a semiconductor light source composed of semiconductor light emitting elements.

2. Related Art

Conventionally, vehicle lighting fixtures using a semiconductor light emitting element, such as an LED (Light Emitting Diode), as a light source are well known. Vehicle lighting fixtures of this type have a lighting control circuit for controlling the lighting of the LED.

A lighting control circuit using a switching regulator capable of controlling the output voltage to the LED based on the current of the LED is well known. The switching regulator can control the output voltage to flow a specified current through each LED, even if a plurality of LEDs are connected in series or parallel as the load.

However, if the output of the switching regulator is short circuited, or has a ground fault, the switching regulator has a heavier load, and may fail with the excessive power load. Also, if the output of the switching regulator is opened due to a disconnection in the LED, the output voltage may be increased excessively, for example, in a switching regulator of a flyback type.

Thus, a switching regulator has been proposed in which, when a failure of the switching regulator on the output side is detected, the output voltage of the switching regulator is lowered (refer to patent document 1).

[Patent Document 1] JP-A-2004-134147 (pages 3 to 8, FIG. 1)

In the above prior art, a plurality of LED groups are connected in parallel on the output side of the switching regulator, a shunt resistor is connected in series to each LED group, the voltage across each shunt resistor is monitored by a failure detection part, the output voltage of the switching regulator is controlled so that the current of each LED group may become a specified value, and the output voltage of the switching regulator is lowered when the failure occurs, whereby even if some of the LEDs fail, the operating LEDs can be protected. However, there is no consideration of the case where a failure detection wiring that leads the connection point of each LED group and each shunt resistor to the failure detection part is disconnected.

That is, in detecting the failure of each LED group, where a connection point between each LED group and each shunt resistor is connected via a failure detection wiring to the failure detection part, when this failure detection wiring is disconnected, no signal is inputted into the failure detection part, even if the LED groups are normal. Thus, the failure detection part falsely detects a failure caused by opening the LED group. Consequently, the output voltage of the switching regulator is controlled to be lower even if the LEDs are normal.

SUMMARY OF THE INVENTION

Presupposing that the failure detection wiring connecting the connection point between each LED group and each shunt resistor and the failure detection part is opened, if no signal is inputted from this failure detection wiring to the failure detection part (high impedance occurs), a special circuit may be provided within the switching regulator to have a voltage within the normal range. However, in this case, for example, if the failure detection wiring is kept open at a product assembling step or the failure detection wiring is kept open for some reason, the failure cannot be detected, even when the failure occurs in the LED groups.

Also, the opening of the failure detection wiring may occur due to human error, or when a stress is applied to the failure detection wiring. Specifically, in a case where a bracket (structure for supporting the semiconductor) of the LED is swiveled to control the light distribution in accordance with a running state or the vehicle condition, for example, a stress may be applied on the failure detection wiring, every time the bracket of the LED swivels in the transverse direction. Particularly, in a case where the bracket of the LED is also moved in the longitudinal direction for aiming or leveling, a stress in the longitudinal direction as well as the transverse direction may be applied on the failure detection wiring. Therefore, when the failure detection wiring is opened due to human error or stress, the LED may not be lighted.

One or more embodiments of the present invention detect a failure of the semiconductor light source when the failure detection wiring is normally connected, and turn off the semiconductor light source, when the failure detection wiring is opened.

One or more embodiments of the present invention relate to a vehicle lighting apparatus comprising a plurality of semiconductor light sources that are connected with each other in series, a switching regulator for supplying an electric power from a power source to each of the plurality of semiconductor light sources, forward voltage detection means for detecting a forward voltage of each group by dividing the plurality of semiconductor light sources into groups, and failure detection means for detecting the failure of the semiconductor light sources belonging to the each group based on the detected output of the each forward voltage detection means, wherein there are arranged between the groups a first voltage detection terminal and a second voltage detection terminal, mutually connected, as the voltage detection terminals connected to the forward voltage detection means to detect at least one of the groups, as well as a first failure detection wiring connecting the semiconductor light sources belonging to one group and the first voltage detection terminal and a second failure detection wiring connecting the semiconductor light sources belonging to the other group and the second voltage detection terminal.

In mutually connecting the plurality of semiconductor light sources, among the semiconductor light sources belonging to each group, the semiconductor light source not adjacent to the other groups is connected to the other semiconductor light source within each group or the switching regulator, and the semiconductor light source adjacent to the other groups is connected via the first failure detection wiring to the first voltage detection terminal or via the second failure detection wiring to the second voltage detection terminal. Therefore, when the first failure detection wiring and the first voltage detection terminal are securely connected, and the second failure detection wiring and the second voltage detection terminal are securely connected, each semiconductor light source is lighted, if each semiconductor light source is normal. Thereafter, the forward voltage of each group is monitored by each forward voltage detection means, and when a failure occurs in any semiconductor light source, the failure of the semiconductor light source can be detected by the failure detection means, based on the detected output of any forward voltage detection means. That is, the failure of the semiconductor light source caused by the opening or lower forward voltage can be detected, when any semiconductor light source is opened or the forward voltage is lower on the condition that each semiconductor light source is lighted.

On the other hand, when the first failure detection wiring or the second failure detection wiring arranged between any groups is in the open state, the circuit connecting the power source and the semiconductor light sources of each group is shut off by the failure detection wiring, whereby all the semiconductor light sources are not lighted but turned off, so that the opening of the first failure detection wiring or the second failure detection wiring and the turning off of each semiconductor light source can be coincident.

In this way, the failure detection wirings between the groups are normally connected, the failure of the semiconductor light source is detected on the condition that each semiconductor light source is lighted, whereby the opening of the failure detection wiring is prevented from being falsely detected as the failure of the semiconductor light source, so that the failure of the semiconductor light source can be accurately detected.

In accordance with one or more embodiments of the present invention, the plurality of semiconductor light sources are divided into a movable group including only the semiconductor light sources arranged movably and a fixed group including only the fixed semiconductor light sources, and the first voltage detection terminal and the second voltage detection terminal, as well as the first failure detection wiring and the second failure detection wiring, are arranged between the movable group and the fixed group or corresponding to the fixed group.

In arranging the first and second voltage detection terminals and the first and second failure detection wirings between the groups including the semiconductor light sources, each voltage detection terminal and each failure detection wiring are arranged between the movable group and the fixed group, or between the fixed groups, but not arranged between the movable groups, whereby even if the movable group is supported by the bracket swiveled in the transverse direction or on the substrate, the stress is only applied on the first failure detection wiring or the second failure detection wiring arranged between the movable group and the fixed group, so that there is less possibility that the failure detection wiring connected to the movable group is opened than where the first and second voltage detection terminals and the first and second failure detection wirings are arranged between the movable groups.

As will be apparent from the above explanation, with the vehicle lighting apparatus in accordance with one or more embodiments of the present invention, the opening of the failure detection wiring is prevented from being falsely detected as the failure of the semiconductor light source, whereby the failure of the semiconductor light source can be securely detected.

In accordance with one or more embodiments of the present invention, the possibility that the failure detection wiring connected to the movable group is opened is reduced.

Other aspects and advantages of the invention will be apparent from the following description and the appended claims.

BRIEF DESCRIPTION OF THE DRAWINGS

FIGS. 4(a) to 4(f) are waveform charts for explaining the operation of the control circuit.

DETAILED DESCRIPTION OF THE EXEMPLARY EMBODIMENTS

Figure 1:
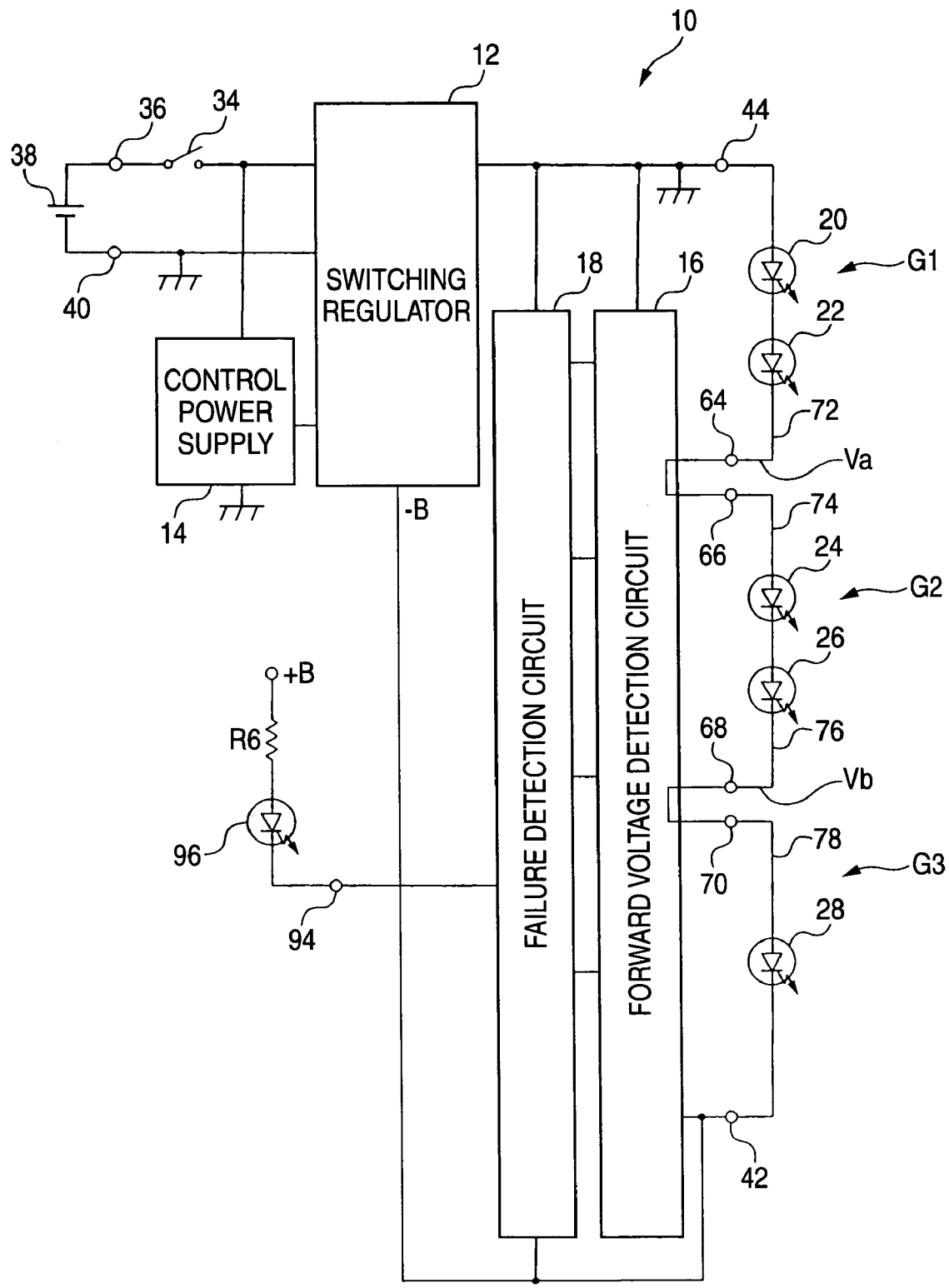
FIG. 1 is a circuit block diagram of a vehicle lighting apparatus according to one embodiment of the present invention.
Figure 2:
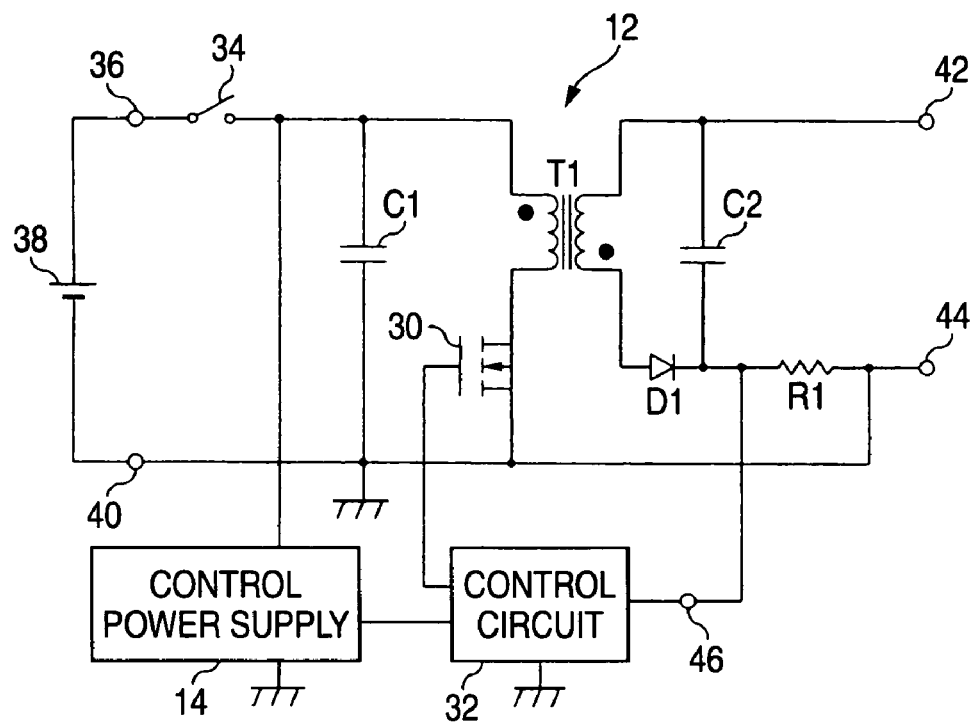
FIG. 2 is a circuit block diagram of a switching regulator.
Figure 3:
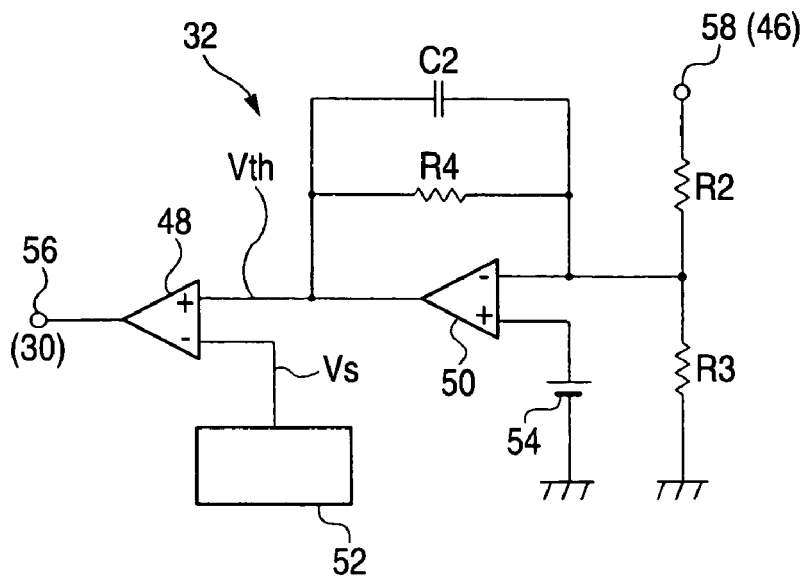
FIG. 3 is a circuit block diagram of a control circuit.
Figure 5:
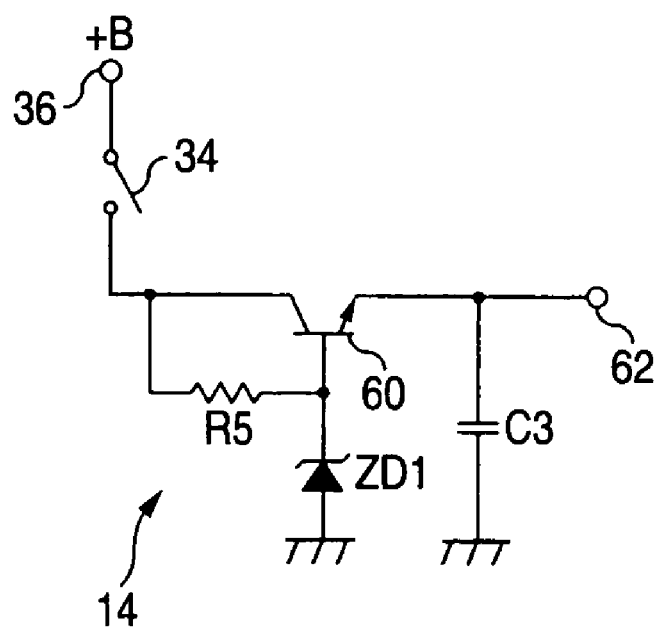
FIG. 5 is a circuit block diagram of a control power supply.
Figure 6:
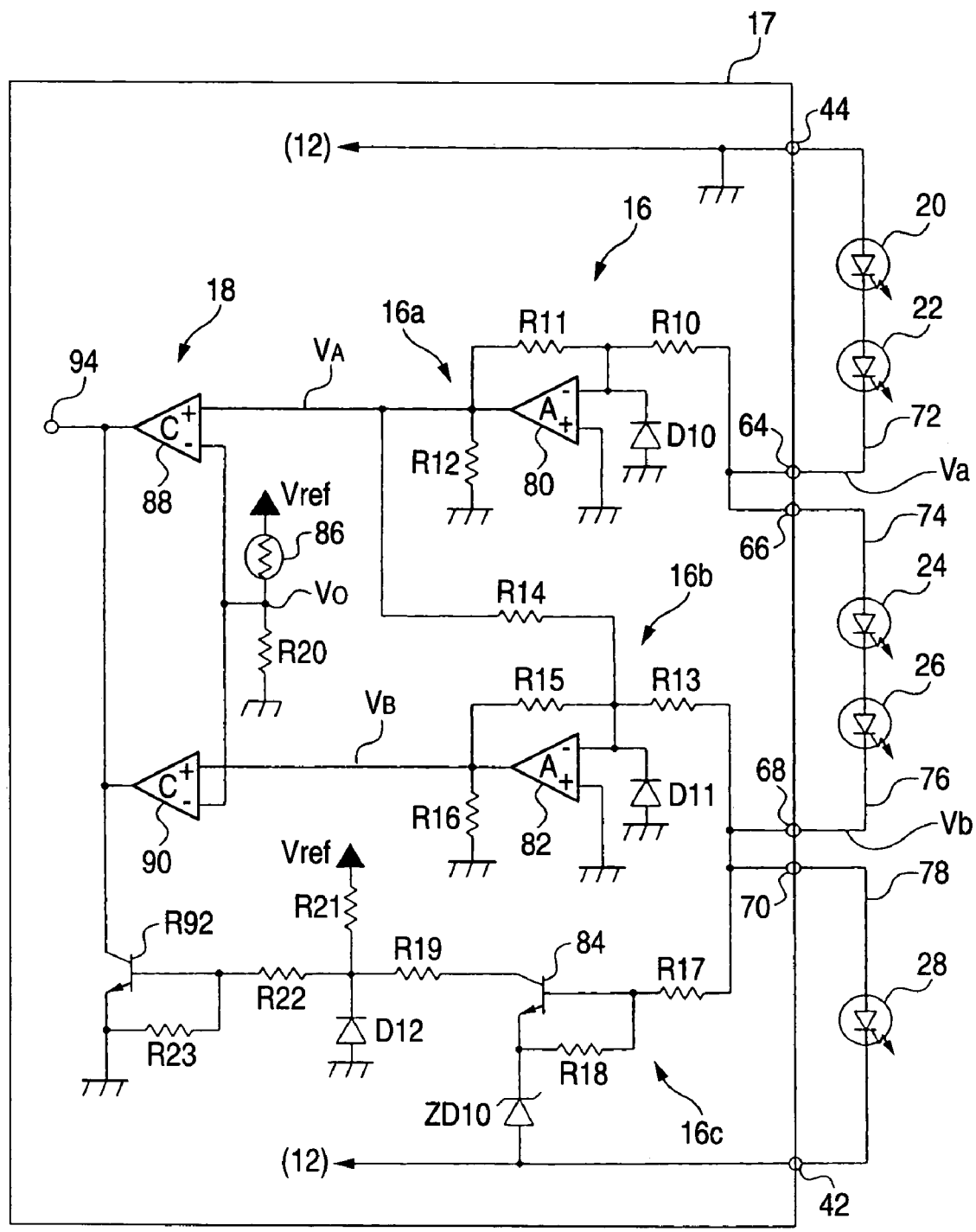
FIG. 6 is a circuit block diagram of a forward voltage detection circuit and a failure detection circuit according to one embodiment of the invention.

Embodiments of the present invention will be described below with reference to the figures. FIG. 1 is a circuit block diagram of a vehicle lighting apparatus according to one embodiment of the invention. FIG. 2 is a circuit block diagram of a switching regulator. FIG. 3 is a control block diagram of a control circuit. FIGS. 4(a) to 4(e) are waveform charts for explaining the operation of the control circuit. FIG. 5 is a circuit block diagram of a control power supply. FIG. 6 is a circuit block diagram showing a forward voltage detection circuit and a failure detection circuit according to the embodiment of the invention.

In these drawings, a vehicle lighting apparatus 10 making up a vehicle lighting fixture comprises a switching regulator 12, a control power supply 14, a forward voltage detection circuit 16, and a failure detection circuit 18, as a lighting control unit, as shown in FIG. 1. The LEDs 20, 22, 24, 26 and 28 are connected as the load to the switching regulator 12. The LEDs 20 to 28 are mutually connected in series to the output side of the switching regulator 12, as the semiconductor light sources composed of semiconductor light emitting diodes.

The LEDs 20 to 28 consist of light source blocks being connected in parallel, each light source block having a plurality of LEDs mutually connected in series, or a multi-chip LED containing a plurality of LED chips within a package. Also, the LEDs 20 to 28 may be made as light sources for various kinds of vehicle lighting fixtures such as a head lamp, a stop and tail lamp, a fog lamp and a turn signal lamp.

The switching regulator 12 comprises a transformer T1, a capacitor C1, an NMOS transistor 30, a control circuit 32, a diode D1, a capacitor C2 and a shunt resistor R1, as shown in FIG. 2. The capacitor C1 is connected in parallel and the NMOS transistor 30 is connected in series to the primary side of the transformer T1. One end of the capacitor C1 is connected via a power switch 34 and a power input terminal 36 to the positive terminal of a vehicle mounted battery (DC power source) 38, and the other end is connected via a power input terminal 40 to the negative terminal of the vehicle mounted battery 38 and grounded. The NMOS transistor 30 has the drain connected to the primary side of the transformer T1, the source grounded and the gate connected to the control circuit 32. The capacitor C2 is connected in parallel via the diode D1 to the secondary side of the transformer T1, the connection point between the diode D1 and the capacitor C2 being connected via the shunt resistor R1 and an output terminal 44 to the anode side of the LED 20. One end on the secondary side of the transformer T1 is connected, together with one end of the capacitor C2, via an output terminal 42 to the cathode side of the LED 28. The output terminal 42 is the terminal that outputs a negative voltage (−B) with respect to the reference potential (ground potential: 0V). The control circuit 32 is connected via a current detection terminal 46 to the connection point between the diode D1 and the capacitor C2. The shunt resistor R1 is current detection means for detecting the current flowing through the LEDs 20 to 28, and feeds back the voltage across the shunt resistor R1 as the current of the LEDs 20 to 28 to the control circuit 32.

The NMOS transistor 30 is a switching element that is turned on or off in response to the on/off signal (switching signal) outputted from the control circuit 32. When the NMOS transistor 30 is turned on, the input voltage from the vehicle mounted battery 38 is accumulated as electromagnetic energy in the transformer T1. When the NMOS transistor 30 is turned off, the electromagnetic energy accumulated in the transformer T1 is discharged as luminescence energy from the secondary side of the transformer T1 via the diode D1 to the LEDs 20 to 28.

That is, the switching regulator 12 is current supply control means for controlling the supply of current to the LEDs 20 to 28 by receiving the supply of electric power from the vehicle mounted battery 38. In this case, the switching regulator 12 controls the output current based on the comparison result by comparing the voltage of the current detection terminal 46 with the specified voltage.

Specifically, the control circuit 32 for controlling the switching regulator 12 comprises a comparator 48, an error amplifier 50, a saw-tooth wave generator 52, a reference voltage 54, the resistors R2, R3 and R4, and a capacitor C2, as shown in FIG. 3. An output terminal 56 of the comparator 48 is connected directly or via a preamplifier for current amplification (not shown) to the gate of the NMOS transistor 30, and an input terminal 58 connected to one end of the resistor R2 is connected to the current detection terminal 46. A feedback voltage from the current detection terminal 46 is applied to the input terminal 58, in which the resistors R2 and R3 divide the voltage applied to the input terminal 58, a partial voltage obtained by dividing the voltage being applied to a negative input terminal of the error amplifier 50. The error amplifier 50 outputs the voltage according to a difference between the voltage applied to the negative input terminal and the reference voltage 54 as a threshold Vth to a positive input terminal of the comparator 48. The comparator 48 takes a saw-tooth wave Vs from the saw-tooth wave generator 52 into the negative input terminal, compares this saw-tooth wave Vs with the threshold Vth, and outputs an on/off signal according to this comparison result to the gate of the NMOS transistor 30.

For example, when the level of the threshold Vth is almost intermediate in the saw-tooth wave Vs, the on/off signal with an on-duty of about 50% is outputted, as shown in FIGS. 4(a) and 4(b). On the other hand, when the level of the voltage fed back from the current detection terminal 46 is lower than the reference voltage 54 as the output current of the switching regulator 12 decreases, the level of the threshold Vth with the output of the error amplifier 50 increases, so that an on/off signal with an on-duty of above 50% is outputted from the comparator 48, as shown in FIGS. 4(c) and 4(d). As a result, the output current of the switching regulator 12 increases.

Conversely, when, the level of the voltage fed back from the current detection terminal 46 is higher than the reference voltage 54 and the level of the threshold Vth with the output of the error amplifier 50 decreases as the output current of the switching regulator 12 increases, an on/off signal with an on-duty of below 50% is outputted from the comparator 48, as shown in FIGS. 4(e) and 4(f). As a result, the output current of the switching regulator 12 decreases. Instead of the saw-tooth wave generator 52, a chopping wave generator for generating the chopping wave (chopping wave signal) may be employed.

An electric power is supplied from the control power supply 14 to the control circuit 32. The control power supply 14 comprises an NPN transistor 60, a resistor R5, a Zener diode ZD1 and a capacitor C3, as a series regulator, as shown in FIG. 5. The collector of the NPN transistor 60 is connected via a power supply switch 34 to the power supply input terminal 36, and the emitter is connected via an output terminal 62 to the control circuit 32. The NPN transistor 60 outputs a voltage according to the Zener voltage occurring across the Zener diode ZD1 from the emitter via the output terminal 62 to the control circuit 32, when a power supply voltage is applied from the power input terminal 36.

On the other hand, the forward voltage detection circuit 16 comprises the forward voltage detection circuits 16a, 16b and 16c, which are mounted on a printed board 17, as shown in FIG. 6. The forward voltage detection circuits 16a, 16b and 16c are a forward voltage detection means group for detecting the forward voltage Vf of each group by dividing the LEDs 20 to 28 into a plurality of groups, and outputting each detected result to the failure detection circuit 18, with the forward voltage detection circuits being connected to one end of the LEDs 22 to 28 via the voltage detection terminals 64, 66, 68, 70 and the output terminal 42 on the input side.

Specifically, each of the forward voltage detection circuits 16a to 16c detects the forward voltage Vf (the total forward voltage of two LEDs 20, 22, or LEDs 24, 26) for the groups G1 and G2 or the forward voltage Vf (forward voltage of one LED 28) for the group G3 and outputs each detected result to the failure detection circuit 18 by dividing the LEDs 20 to 28 into a movable group G1 including only the LEDs 20, 22 arranged on a movable substrate or bracket, a fixing group G2 including only the LEDs 24, 26 fixed on the substrate or bracket and a fixing group G3 including only the LED 28 fixed on the substrate or bracket.

In this case, the voltage detection terminal 64 is fixed on the printed board 17 as a first voltage detection terminal arranged between the movable group G1 and the fixing group G2, and the voltage detection terminal 66 is fixed on the printed board 17 as a second voltage detection terminal arranged between the movable group G1 and the fixing group G2, in which the voltage detection terminals are connected with each other within the forward voltage detection circuit 16a via the circuit wiring on the printed board 17. The voltage detection terminal 64 is the connection terminal for connecting the printed board 17 and the LED 22, and is connected to the cathode side of the LED 22 via a failure detection wiring (first failure detection wiring) 72. The voltage detection terminal 66 is the connection terminal for connecting the printed board 17 and the LED 24, and is connected to the anode side of the LED 24 via a failure detection wiring (second failure detection wiring) 74.

On the other hand, the voltage detection terminal 68 is fixed on the printed board 17 as a first voltage detection terminal arranged between the fixing group G2 and the fixing group G3, and the voltage detection terminal 70 is fixed on the printed board 17 as a second voltage detection terminal arranged between the fixing group G2 and the fixing group G3, in which the voltage detection terminals 68 and 70 are connected with each other within the forward voltage detection circuit 16b or 16c via the circuit wiring on the printed board 17. The voltage detection terminal 68 is the connection terminal for connecting the printed board 17 and the LED 26, and is connected to the cathode side of the LED 26 via a failure detection wiring (first failure detection wiring) 76. The voltage detection terminal 70 is the connection terminal for connecting the printed board 17 and the LED 28, and is connected to the anode side of the LED 28 via a failure detection wiring (second failure detection wiring) 78. That is, among the LEDs 20 to 28 belonging to the groups G1 to G3, the LEDs 22, 24, 26 and 28 adjacent to other groups are connected with each other through a bypass circuit having the failure detection wirings 72, 74, 76 and 78, the voltage detection terminals 64, 66, 68 and 70, and the forward voltage detection circuits 16a, 16b and 16c.

The forward voltage detection circuit 16a comprises an inverted amplifier 80, the resistors R10, R11 and R12, and a diode D10 for the LEDs 20 and 22 of detection object belonging to the movable group G1. The inverted amplifier 80 has its negative input terminal connected via a resistor R10 to the voltage detection terminals 64 and 66, and is the inverted amplification means for inversely amplifying the terminal voltage Va of the voltage detection terminal 64. Assuming that the forward voltages of the LEDs 20 to 28 are Vf (forward voltage for one LED chip), the terminal voltage Va is −2Vf on the basis of the reference potential (GND)=0V. The amplification degree of the inverted amplifier 80 is −R/r, where the resistance value of the resistor R10 is "r" and the resistance value of the resistor R11 is "R". For the sake of simpler explanation, the output voltage $V_A$ of the inverted amplifier 80 is +2Vf, where the amplification degree of the inverted amplifier 80 is "1".

The forward voltage detection circuit 16b comprises an inverted amplifier 82, the resistors R13, R14, R15 and R16, and a diode D11 for the LEDs 24 and 26 of detection object belonging to the fixing group G2. The inverted amplifier 82 has its negative input terminal connected via a resistor R13 to the voltage detection terminals 68 and 70, and via a resistor R14 to the output side of the inverted amplifier 80. This forward voltage detection circuit 16b is inverted amplification means for difference amplification for inversely amplifying a difference between the output voltage $V_A$ of the inverted amplifier 80 and the terminal voltage Vb of the voltage detection terminal 68 by inputting the output voltage $V_A$ of the inverted amplifier 80 as the operation voltage via the resistor R14 and inputting the terminal voltage Vb of the voltage detection terminal 68. Assuming that the forward voltages of the LEDs 20 to 28 are Vf, the terminal voltage Vb is −4Vf on the basis of the reference potential 0V. The output voltage $V_B$ of the inverted amplifier 82 is −(−4Vf+2Vf)=+2Vf, where the amplification degrees of the inverted amplifiers 80 and 82 are "1".

The forward voltage detection circuit 16c comprises an NPN transistor 84, the resistors R17, R18 and R19, and a Zener diode ZD10 for the LED 28 of detection object belonging to the fixing group G3. The NPN transistor 84 has the base connected via the resistor R17 to the voltage detection terminals 68 and 70, the collector connected via the resistor R19 to the failure detection circuit 18, and the emitter connected via the Zener diode ZD10 to the output terminal 42. This forward voltage detection circuit 16c does not inversely amplify the terminal voltage Vb of the voltage detection terminals 68 and 70, but detects whether or not the terminal voltage Vb exceeds the set voltage. That is, when a potential difference between the terminal voltage Vb and the output terminal 42 is less than or equal to the set voltage (Zener voltage of the Zener diode D10+$V_{BE}$ of the NPN transistor 84), the NPN transistor 84 is in the off state, in which it outputs a "high level" signal to the resistor R19. When the terminal voltage Vb exceeds the set voltage, the NPN transistor is in the on state, in which it outputs a "low level" signal via the resistor R19.

In this way, the forward voltage detection circuits 16a and 16b detect the forward voltage Vf (forward voltage of two LEDs) for the movable group G1 and the fixing group G2, and output each detected result as the output voltage $V_A$, $V_B$=+2Vf to the failure detection circuit 18. The forward voltage detection circuit 16c detects whether or not the forward voltage Vf (forward voltage of one LED) for the fixing group G3 exceeds the set voltage, and outputs the detection result as the "high level" or "low level" signal to the failure detection circuit 18.

The failure detection circuit 18 comprises a thermistor 86, the comparators 88 and 90, an NPN transistor 92, the resistors R20, R21, R22 and R23, and a diode D12, as failure detection means. The comparators 88 and 90 have the positive input terminal connected to the output side of the inverted amplifiers 80 and 82, and the negative input terminal connected to a connection point (reference voltage=Vo) between the resistor R20 and the thermistor 86, with their output terminals being wired OR connected with each other to an external connection terminal 94. The NPN transistor 92 has the emitter grounded, the base connected via the resistor R22 to the connection point between the resistor R21 and the diode D12 and to the resistor R19, and the collector connected to the external connection terminal 94. The external connection terminal 94 is connected via an LED 96 and the resistor R6 to the positive terminal of the vehicle mounted battery 38.

The comparators 88 and 90 compare the output voltage $V_A$, $V_B$=+2Vf of the inverted amplifiers 80 and 82 with the reference voltage Vo, in which a "low level" failure detection signal is outputted to the external connection terminal 94, only if any of the output voltages $V_A$, $V_B$ is below the reference voltage Vo, or otherwise a "high level" signal is outputted. The NPN transistor 92 is in the off state to output the "high level" signal to the external connection terminal 94, when the LED 28 is in a normal state and the collector of the NPN transistor 84 in the on state is at the "low level". On the other hand, the NPN transistor 92 is in the on state to output a "low level" failure detection signal to the external connection terminal 94, when the LED 28 is in the failure state and the collector of the NPN transistor 84 in the off state is at the "high level".

If the external connection terminal 94 becomes from "high level" to "low level", the LED 96 is lighted to inform the driver that there is a failure in any of the LEDs 20 to 28 belonging to the movable group G1 and the fixing groups G2 and G3 caused by the opening (open) or lower forward voltage Vf.

In this embodiment, when the plurality of LEDs 20 to 28 are connected with each other, among the LEDs 20 to 28 belonging to the movable group G1 or fixing groups G2, G3, the LED 20 not adjacent to the other groups is connected to the other LED 22 within the movable group G1, and connected to the switching regulator 12, and the LEDs 22, 24, 26 and 28 adjacent to the other groups are connected via the failure detection wirings 72, 74, 76 and 78 to the voltage detection terminals 64, 66, 68 and 70. Therefore, when the failure detection wiring 72 and the voltage detection terminal 64 are securely connected, the failure detection wiring 76 and the voltage detection terminal 68 are securely connected, the failure detection wiring 74 and the voltage detection terminal 66 are securely connected, and the failure detection wiring 78 and the voltage detection terminal 70 are securely connected, the LEDs 20 to 28 are lighted upon turning on the power switch 34, if the LEDs 20 to 28 are normal. Thereafter, the forward voltage of each group G1 to G3 is monitored by each forward voltage detection circuit 16. When there is a failure in the LED belonging to any group, this failure of the LED can be detected by the failure detection circuit 18, based on the detection output of the forward voltage detection circuit 16. That is, on the condition that the LEDs 20 to 28 are lighted, when any LED is opened or the forward voltage falls, the failure of the LED caused by the opening or the lower forward voltage can be detected.

On the other hand, the failure detection wirings 72, 74, 76 and 78 arranged between the groups G1 to G3 (between groups G1 and G2, between groups G2 and G3) are more likely to open than the wiring on the printed board 17. When any of the failure detection wirings 72 to 78 is open, a circuit connecting the switching regulator 12 and the LED 20 to 28 of the groups G1, G2 and G3 is shut off by the opened failure detection wiring, whereby all the LEDs 20 to 28 are not lighted but turned off. Therefore, the opening of the failure detection wirings 72, 74, 76 and 78 and the turning off of the LEDs 20 to 28 can be coincident.

In this way, with this embodiment, on the condition that the failure detection wirings 72, 74 between the groups G1 and G2 and the failure detection wirings 76, 78 between the groups G2 and G3 are normally connected and the LEDs 20 to 28 are lighted, the failure of each LED 20 to 28 is detected, whereby the opening of the failure detection wirings 72, 74, 76 and 78 is prevented from being falsely detected as the failure of any LED, so that the failure of each LED 20 to 28 can be accurately detected.

Also, in this embodiment, in arranging the voltage detection terminals 64 to 70 and the failure detection wirings 72 to 78 between the groups G1 and G2 including the LEDs 20 to 26 or between the groups G2 and G3 including the LEDs 24 to 28, the voltage detection terminals 64, 66 and the failure detection wirings 72, 74 are arranged between the movable group G1 and the fixing group G2, and the voltage detection terminals 68, 70 and the failure detection wirings 76, 78 are arranged between the fixing groups G2 and G3, but the voltage detection terminal or the failure detection wiring is not arranged between the movable groups, even if plural movable groups exist, whereby even if the movable group G1 is supported on, for example, a bracket or substrate swiveling in the transverse direction, a stress is only applied on the failure detection wiring 72 arranged between the movable group G1 and the fixing group G2, so that there is less possibility that the failure detection wiring connected to the LED belonging to the movable group opens than where the voltage detection terminal or the failure detection wiring is arranged between the movable groups.

In this embodiment, the failure detection circuit 18 may be configured by using a microcomputer (micon) that converts the output voltage of the forward voltage detection circuits 16a to 16c into a digital signal, comparing the converted digital signal with the reference value, and determines the presence or absence of the failure, based on this comparison result, instead of using the comparators 88, 90 and the NPN transistor 92.

While in this embodiment, the switching regulator 12 outputs a negative voltage (reference potential=negative with respect to group 0V), the invention may be applied to the switching regulator 12 that outputs a positive voltage (reference potential=positive with respect to group 0V).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS AND SIGNS

10 vehicle lighting apparatus
12 switching regulator
14 control power supply
16, 16a to 16c forward voltage detection circuit
18 failure detection circuit
20 to 28 LED

What is claimed is:

1. A vehicle lighting apparatus comprising:
   a plurality of semiconductor light sources that are connected with each other in series;
   a switching regulator for supplying an electric power from a power source to each of said plurality of semiconductor light sources;
   a forward voltage detection circuit for detecting a forward voltage of each group by dividing said plurality of semiconductor light sources into groups;
   a failure detection circuit for detecting the failure of the semiconductor light sources belonging to said each group based on the detected output of said each forward voltage detection circuit;
   a first voltage detection terminal;
   a second voltage detection terminal mutually connected to the first voltage detection terminal;
   a first failure detection wiring connecting the semiconductor light sources belonging to one group and said first voltage detection terminal; and
   a second failure detection wiring connecting the semiconductor light sources belonging to another group and said second voltage detection terminal,
   wherein the first voltage detection terminal and the second voltage detection terminal are arranged between said groups and connected to the forward voltage detection circuit to detect voltage of at least one of said group.

2. The vehicle lighting apparatus according to claim 1, wherein said plurality of semiconductor light sources are divided into a movable group including only semiconductor light sources arranged movably and a fixed group including only fixed semiconductor light sources, and wherein said first voltage detection terminal and said second voltage detection terminal are arranged between said movable group and said fixed group.

3. The vehicle lighting apparatus according to claim 2, wherein the first failure detection wiring and the second failure detection wiring are arranged between said movable group and said fixed group.

4. The vehicle lighting apparatus according to claim 1, wherein said plurality of semiconductor light sources are divided into a movable group including only semiconductor light sources arranged movably and a fixed group including only fixed semiconductor light sources, and wherein the first voltage detection terminal and the second voltage detection terminal are arranged to correspond to the fixed group.

5. The vehicle lighting apparatus according to claim 4, wherein the first failure detection wiring and the second failure detection wiring are arranged to correspond to the fixed group.

* * * * *